United States Patent
Kamiya

(10) Patent No.: US 11,260,910 B2
(45) Date of Patent: Mar. 1, 2022

(54) SUSPENSION MEMBER

(71) Applicant: Toyota Jidosha Kabushiki Kaisha, Toyota (JP)

(72) Inventor: Kenta Kamiya, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 141 days.

(21) Appl. No.: 16/842,127

(22) Filed: Apr. 7, 2020

(65) Prior Publication Data
US 2020/0406977 A1    Dec. 31, 2020

(30) Foreign Application Priority Data

Jun. 27, 2019    (JP) .............................. JP2019-119772

(51) Int. Cl.
*B62D 21/02* (2006.01)
*B62D 21/11* (2006.01)
*B62D 25/02* (2006.01)

(52) U.S. Cl.
CPC ............ *B62D 21/11* (2013.01); *B62D 25/025* (2013.01)

(58) Field of Classification Search
CPC ............... B62D 21/11; B62D 25/025
USPC ................ 280/785, 788, 789, 790, 797, 800
See application file for complete search history.

(56) References Cited

U.S. PATENT DOCUMENTS

| | | | | |
|---|---|---|---|---|
| 4,726,166 A | * | 2/1988 | DeRees | B62D 21/02 52/694 |
| 5,507,522 A | * | 4/1996 | Ritchie | B62D 21/00 280/800 |
| 5,558,369 A | * | 9/1996 | Cornea | B62D 21/09 280/781 |
| 6,733,040 B1 | * | 5/2004 | Simboli | B62D 21/02 280/784 |
| 10,370,040 B1 | * | 8/2019 | Cooper | B62D 21/157 |
| 2011/0049937 A1 | * | 3/2011 | Fujii | B62D 25/02 296/204 |

FOREIGN PATENT DOCUMENTS

| | | |
|---|---|---|
| JP | 3357234 B2 | 12/2002 |
| JP | 2010-018052 A | 1/2010 |
| JP | 2018-167671 A | 11/2018 |

\* cited by examiner

*Primary Examiner* — Toan C To
(74) *Attorney, Agent, or Firm* — Dinsmore & Shohl LLP

(57) ABSTRACT

A suspension member includes a side rail. The side rail is formed in a closed sectional structure by combining an upper member, a lower member, and a reinforcing member located between the upper member and the lower member. The upper member and the reinforcing member are fixed by welding and form a closed cross section having an upper hollow portion. The reinforcing member and the lower member are fixed by welding and form a closed cross section having a lower hollow portion. A distance from an upper end to a lower end of the upper hollow portion in a vertical direction in the lower bending portion is longer than that in the upper bending portion, and a distance from an upper end to a lower end of the lower hollow portion in the vertical direction in the upper bending portion is longer than that in the lower bending portion.

2 Claims, 6 Drawing Sheets

SUSPENSION MEMBER

CROSS-REFERENCE TO RELATED APPLICATIONS

This application claims priority to Japanese Patent Application No. 2019-119772 filed on Jun. 27, 2019, which is incorporated herein by reference in its entirety including the specification, drawings and abstract.

BACKGROUND

1. Technical Field

The present disclosure relates to a suspension member equipped with a side rail.

2. Description of Related Art

A structure in which a side rail (which may be referred to as a side member) which extends in a forward and rearward direction of a vehicle is joined to a cross member which extends in a width direction of the vehicle is known as a suspension member of a vehicle. The side rail transmits a load input from an end portion to the cross member side at the time of a collision of the vehicle or the like. Generally, the side rail is formed in a closed sectional shape.

Japanese Patent Application Publication No. 2018-167671 (JP 2018-167671 A) which will be described below discloses a structure in which a restriction member which restricts bending is provided inside a side rail of a front suspension member. A bending portion which is bent when a load exceeding an allowable value is applied from in front of the vehicle is provided in the side rail. The restriction member is mounted parallel to the side rail at a position which straddles the bending portion. The side rail is bent again at a contact place with the restriction member after being bent at the bending portion.

Japanese Patent Application Publication No. 2010-18052 (JP 2010-18052 A) which will be described below discloses a structure of a side rail of a rear suspension member. The side rail includes an inclined portion which extends obliquely upward and rearward behind a horizontal portion. A reinforcing member is provided substantially horizontally inside the side rail, and a rear end is connected to the inclined portion. At the time of a rear collision of the vehicle, a load from the rear of the vehicle is set to be input to a rear end of a reinforcing member.

Japanese Patent No. 3357234 (JP 3357234 B) which will be described below discloses a configuration in which a reinforcing member is provided inside a side rail provided at a front portion of a vehicle. The reinforcing member is formed by joining a relatively weak portion at the front and a relatively strong portion at the rear. Then, the relatively strong portion is disposed to be located on a support portion of the side rail such as at an engine and a suspension. At the time of a collision, the relatively weak portion in the front is deformed first, a deformation of the relatively strong portion in the rear is restricted, and thus the support portion is protected.

SUMMARY

The side rail (which may be referred to as a side member) provided on the suspension member may include a lower bending portion which is bent downward toward the cross member and an upper bending portion which is bent upward. When a load in the forward and rearward direction is applied to the side rail, stress is concentrated on the lower bending portion and the upper bending portion, and thus it is required to secure a strength therefor.

JP 2018-167671 A, JP 2010-18052 A, and JP 3357234 B do not disclose how to secure the strength of the lower bending portion and the upper bending portion.

An object of the present disclosure is to propose a new structure which secures a strength in a side rail having a lower bending portion and an upper bending portion.

A suspension member according to the present disclosure includes a side rail which extends in a forward and rearward direction of a vehicle and has a lower bending portion which is bent downward toward a cross member, and an upper bending portion which is bent upward. The side rail is formed in a closed sectional structure by combining an upper member, a lower member, and a reinforcing member located between the upper member and the lower member. The upper member and the reinforcing member are fixed by welding and form a closed cross section having an upper hollow portion. The reinforcing member and the lower member are fixed by welding and form a closed cross section having a lower hollow portion. A distance from an upper end to a lower end of the upper hollow portion in a vertical direction in the lower bending portion is longer than that in the upper bending portion, and a distance from an upper end to a lower end of the lower hollow portion in the vertical direction in the upper bending portion is longer than that in the lower bending portion.

In one aspect of the suspension member according to the present disclosure, a cross section of the upper member may have an inverted U-shape, a cross section of the lower member may have a U-shape, a cross section of the reinforcing member may have a U-shape or an inverted U-shape, the upper member may be welded to an upper portion of an outer surface of a side wall of the reinforcing member, and the lower member may be welded to a lower portion of the outer surface of the side wall of the reinforcing member.

According to the present disclosure, it is possible to set a position of a reinforcing member according to a shape of a bending portion of a side rail and to reinforce the side rail.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, embodiments will be described with reference to the drawings. In the description, specific aspects are shown for easy understanding, but these are merely examples of the embodiments, and various other embodiments can be adopted.

Figure 1:
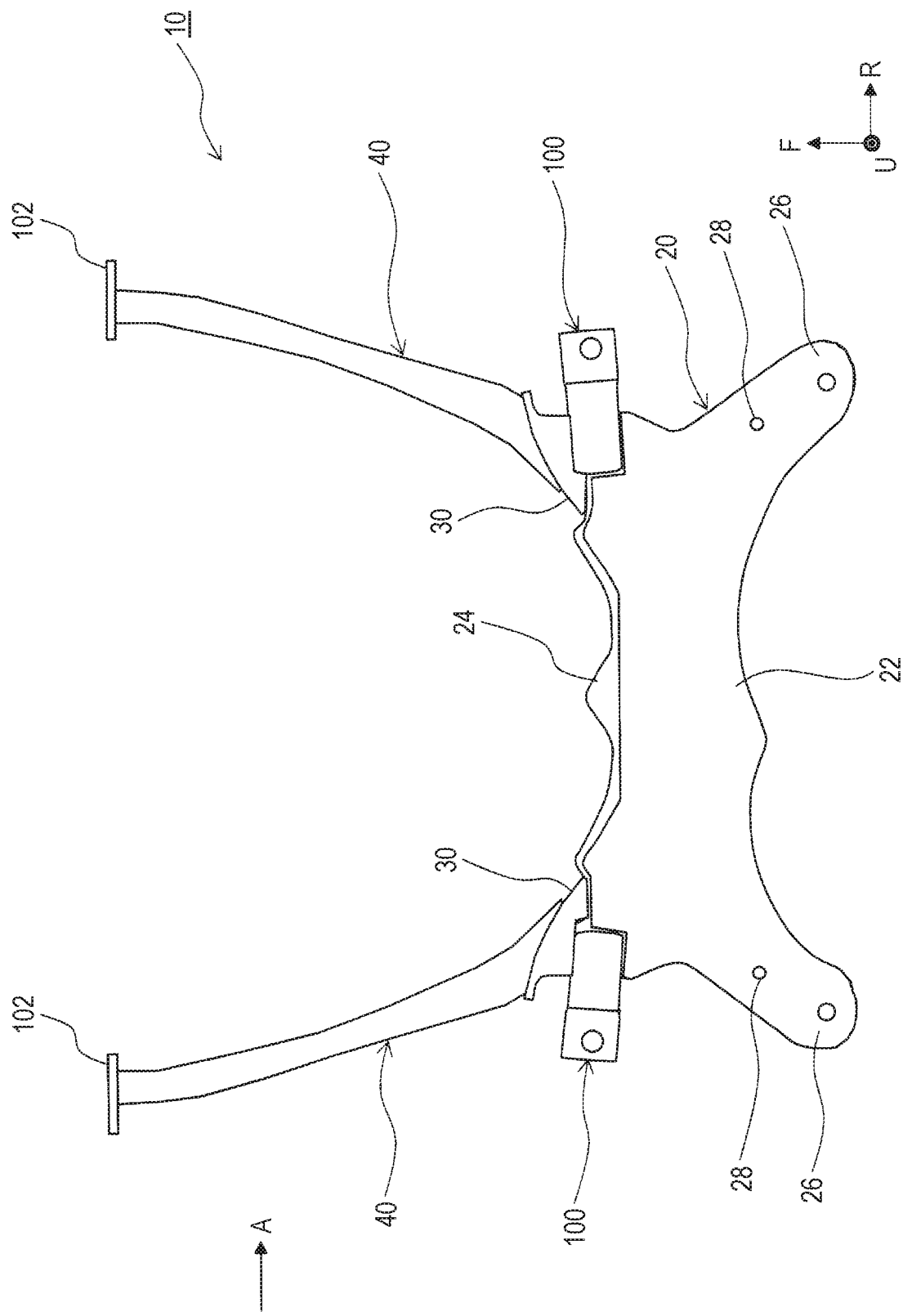
FIG. 1 is a plan view of a front suspension member according to an embodiment.

FIG. 1 is a schematic plan view of a front suspension member 10 of a vehicle according to an embodiment. In a coordinate system in the drawing, an F axis indicates a forward direction of a vehicle, a U axis indicates an upward direction, and an R axis indicates a right direction of an occupant (the same applies to the following drawings).

The front suspension member 10 includes a cross member 20 which is a structural member which extends in a width direction of the vehicle, and a pair of side rails 40 which is a pair of structural members provided on both sides of a front portion of the cross member 20. Both the cross member 20 and the side rails 40 are members made by processing a metal plate such as a steel plate. Here, the structural member is also referred to as a member which is mainly in charge of transmitting a load associated with a weight, an acceleration and deceleration, a collision, and the like of a vehicle. The structural member is also referred to as a framework member, a frame, or the like. Further, a pair of front body mounts 100 which extend upward and outward in the width direction of the vehicle is installed in the vicinity of a space between the cross member 20 and the side rails 40 by welding or the like.

The cross member 20 is formed in a closed sectional shape by joining an upper panel 22, a reinforcing panel 24, and a lower panel (not shown) below the upper panel by welding or the like. A closed cross section refers to a shape in which the periphery is surrounded by members and the inside is hollow when it is cut along a cross section perpendicular to a longitudinal direction (the width direction of the vehicle in the case of the cross member 20). A pair of rear body mounts 26 is provided on both sides of a rear portion of the cross member 20. The rear body mounts 26 support an upper body together with the front body mounts 100.

On both sides of the cross member 20, a lower arm second mounting portion 28 is provided slightly in front of the rear body mount 26. A lower arm (not shown) is mounted on the lower arm second mounting portion 28 and a lower arm first mounting portion (not shown) provided in the vicinity of a lower surface of the front body mount 100 in the cross member 20. The lower arm is a member disposed on both sides of the cross member 20, and a front wheel, a suspension and the like (not shown) are mounted thereon.

Further, the cross member 20 supports an engine (not shown) of the vehicle. The engine is disposed on a center front side of the cross member 20, and the cross member 20 supports a rear lower surface side of the engine. However, the vehicle according to the embodiment does not need to be an engine-driven vehicle and may be, for example, a motor-driven electric vehicle.

Body mount brackets 30 are respectively provided on both front sides of the cross member 20 on the front side of the front body mount 100 by welding or the like. The body mount brackets 30 serve as support portions for the front body mount 100 and also serve as mounting portions for the side rail 40.

The side rail 40 is a long member formed substantially linearly when seen from above. A rear end of the side rail 40 is joined to the body mount bracket 30 of the cross member 20 by welding or the like and extends forward and slightly outward in the width direction of the vehicle. A plate member 102 provided at a front portion of the vehicle is joined to a front end of the side rail 40 by welding or the like. A crash box (not shown) is provided in front of the plate member 102, and a front bumper reinforcement (not shown) is provided in front of the crash box. The side rail 40 receives a large load from a front end via the front bumper reinforcement, the crash box, and the plate member 102 and then transmits the load to the cross member 20 at the time of a front collision of the vehicle. When a very large load is received, the side rail 40 is bent to absorb a collision load (impact energy in terms of energy). However, the side rail 40 is formed not to be bent or to curb bending with respect to a certain degree of load and to maintain a shape thereof.

Figure 2:
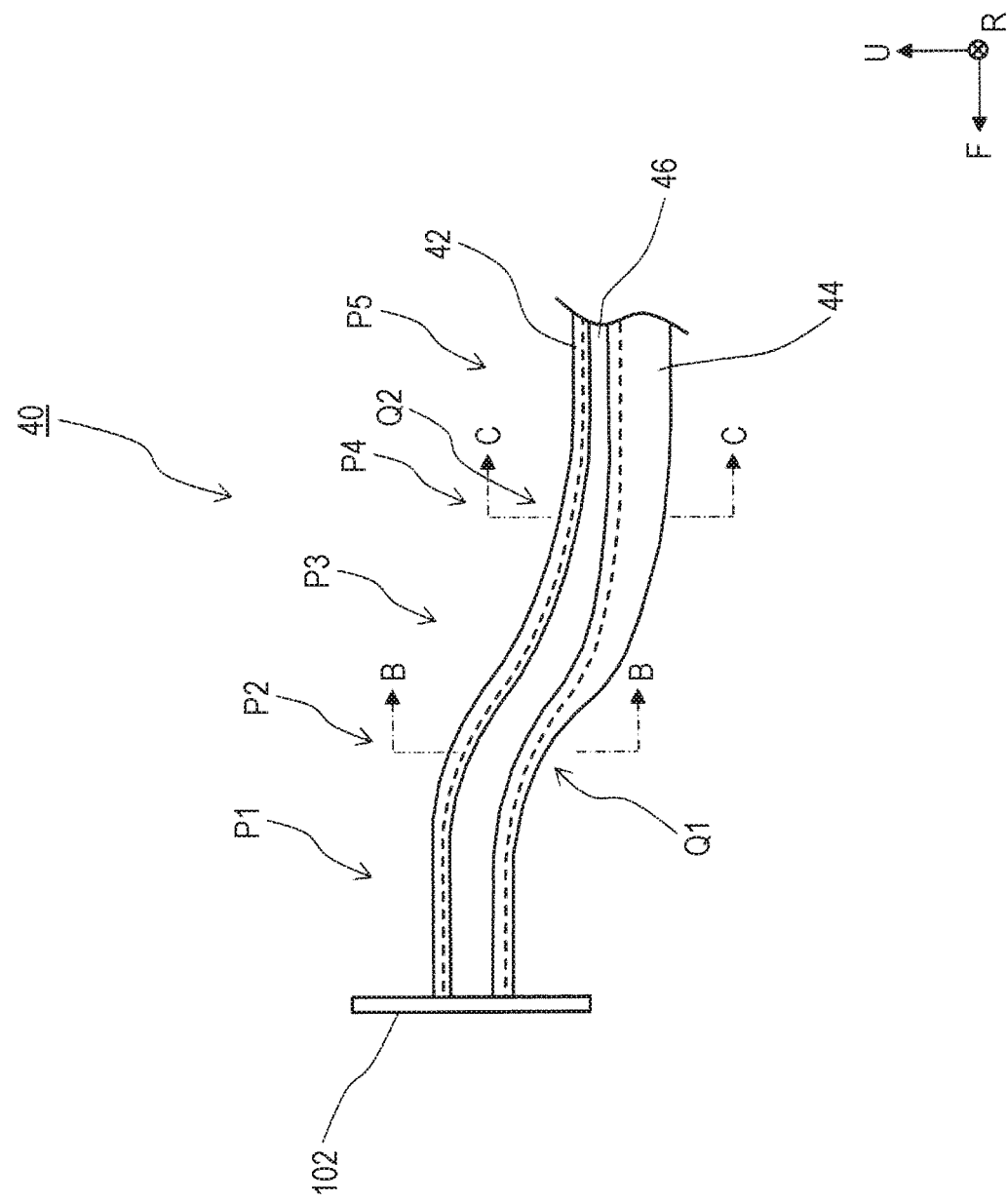
FIG. 2 is a partial side view of a side rail seen in a direction A in FIG. 1.

FIG. 2 is a partial side view showing the side rail 40 on the left side in a direction A in FIG. 1. The side rails 40 can be classified into parts P1, P2, P3, P4, and P5 in order from the front to the back from shape characteristics. The part P1 is located at a forefront portion of the side rail 40 and extends substantially horizontally. The plate member 102 is fixed to a front end of the part P1 by welding or the like. The part P2 is a lower bending portion which has a somewhat large curvature and is bent downward toward the rear. The part P3 is inclined downward toward the rear but is hardly bent. That is, the curvature of the part P3 is almost zero. The part P4 has a curvature and is an upper bending portion which is bent relatively upward toward the rear cross member 20. The part P5 extends substantially horizontally. A part behind the part P5 is also formed horizontally like the part P5, and a rear end is connected to the cross member 20 via the body mount bracket 30. Further, when a thickness in a vertical direction is seen, it can be understood that, although there is a slight difference, the parts P1 and P2 are relatively thin and the parts P3, P4 and P5 are relatively thick.

A rearward load is input to the side rail 40 through the plate member 102 at the time of a front collision of the vehicle. At this time, a uniform stress acts on the entire circumferences of the parts P1 and P5 formed horizontally and the part P3 formed obliquely but substantially linearly.

On the other hand, a stress does not act uniformly at the part P2 which is the lower bending portion and the part P4 which is the upper bending portion. A compression region Q1 which is a lower surface of the part P2 receives a large compressive stress, and a vicinity of an upper surface of the part P2 receives a stress by which it is relatively elongated. Further, a compression region Q2 which is an upper surface of the part P4 receives a large compressive stress, and a vicinity of a lower surface of the part P4 receives a stress by which it is relatively elongated.

The side rail 40 is formed to be able to resist a stress in the compression regions Q1 and Q2 by combining three long members made of a steel plate or the like. The upper member 42 is a member which forms an upper portion of the side rail 40, and the lower member 44 is a member which forms a lower portion of the side rail 40. The reinforcing member 46 is a member provided between the upper member 42 and the lower member 44.

As shown in FIG. 2, when seen from the side, a height of the upper member 42 (a distance between an upper end and a lower end at each position in the forward and rearward direction) is formed to be substantially the same through the parts P1 to P5. A height of the lower member 44 is relatively low at the part P1, gradually increases from the part P2 toward the part P4 and is the highest at the part P5. Further, as is clear from a broken line in FIG. 2, a height of the reinforcing member 46 is relatively high at the part P1, gradually decreases from the part P2 toward the part P4 and is the lowest at the part P5, as opposed to the lower member 44.

Figure 3:
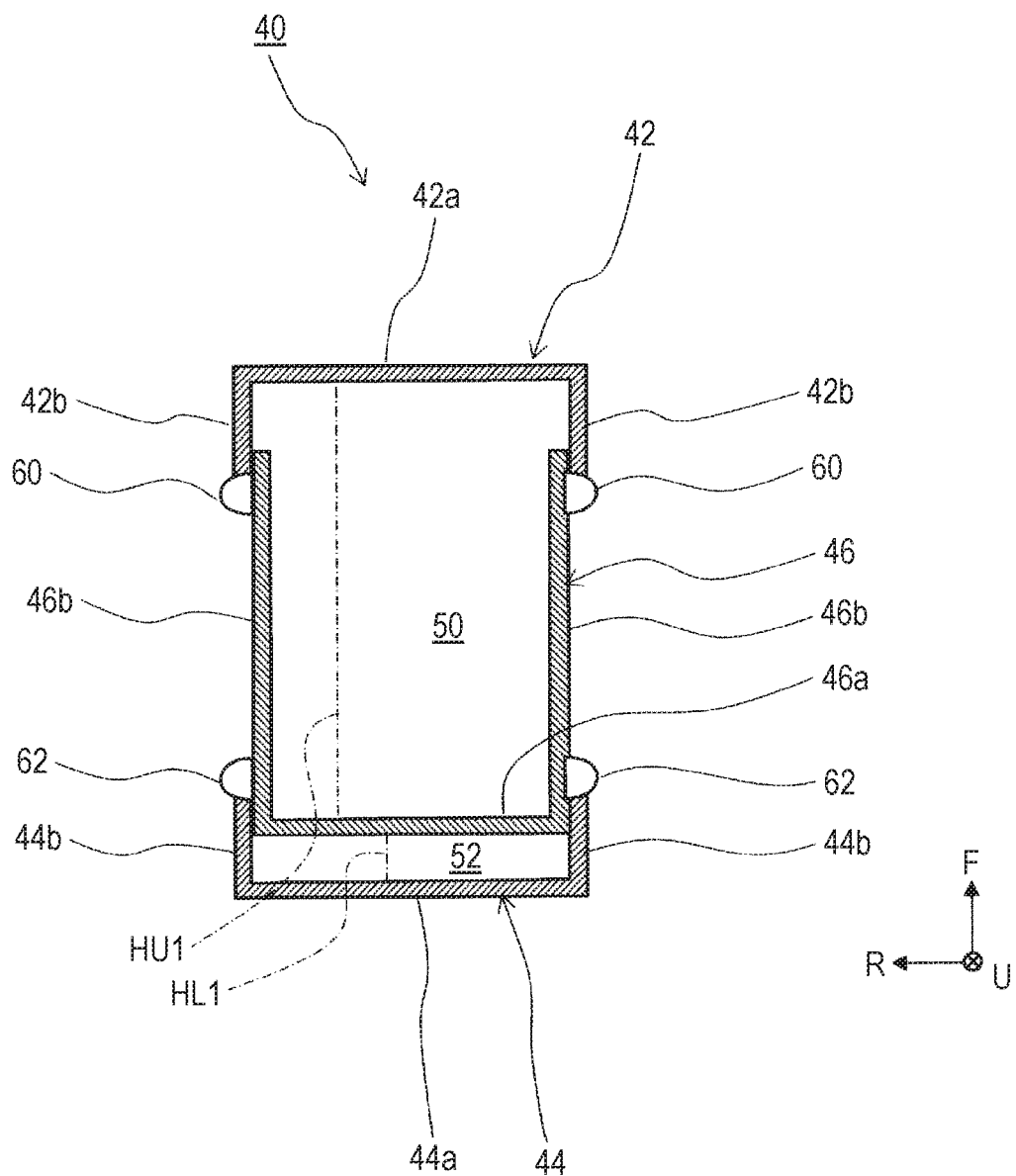
FIG. 3 is a sectional view of the side rail taken along line B-B of FIG. 2.
Figure 4:
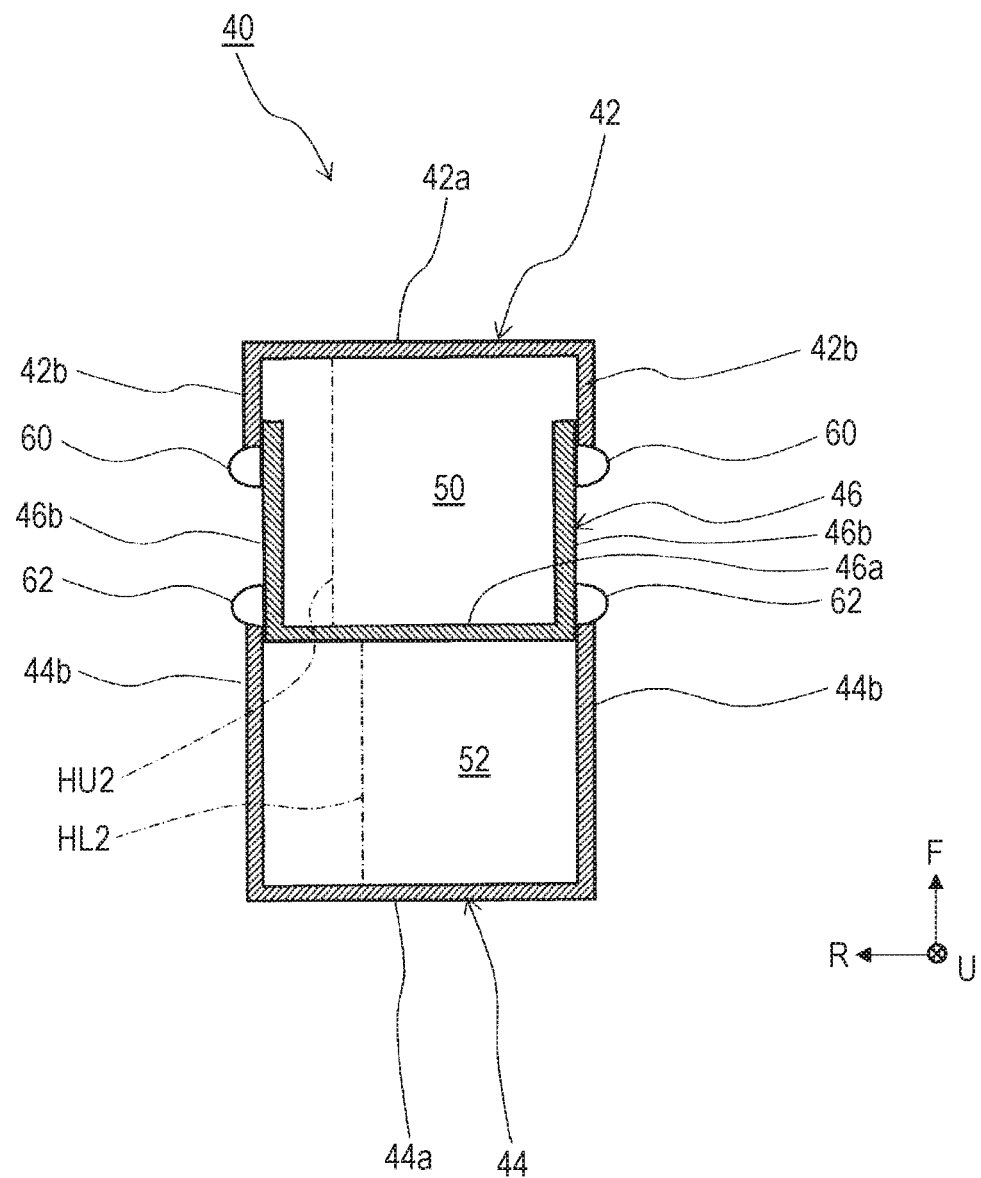
FIG. 4 is a sectional view of the side rail taken along line C-C of FIG. 2.

Here, a sectional shape of the side rail 40 will be described with reference to FIGS. 3 and 4. FIG. 3 is a sectional view of the side rail 40 taken along line B-B in FIG. 2 (that is, it is set to the part P2 which is the lower bending portion), and FIG. 4 is a sectional view of the side rail 40 along line C-C in FIG. 2 (that is, it is set to the part P4 which is the upper bending portion).

As shown in FIG. 3, in the B-B cross section which is the lower bending portion, the side rail 40 is combined so that the U-shaped reinforcing member 46 is sandwiched between the inverted U-shaped upper member 42 and the U-shaped lower member 44. Here, the U-shape refers to a shape having a substantially horizontal lower wall and side walls which extend substantially vertically upward from both sides of the lower wall. The lower wall and the side walls may be flat or may be curved. Further, the inverted U-shape refers to a shape in which the U-shape is rotated by 180 degrees in the drawing. In the embodiment, the upper member 42, the lower member 44, and the reinforcing member 46 are formed by pressing a single metal plate such as a steel plate.

The upper member 42 includes an upper wall 42a which is horizontal and side walls 42b which extend downward from both ends of the upper wall 42a. The lower member 44 includes a lower wall 44a which is horizontal and side walls 44b which extend upward from both ends of the lower wall 44a. The reinforcing member 46 includes a lower wall 46a which is horizontal and side walls 46b which extend upward from both ends of the lower wall 46a. A height of the side wall 42b (a distance between an upper end and a lower end of the side wall 42b) and a height of the side wall 44b are substantially the same, and the height of the side wall 46b is higher than that of the side wall 42b. In the example of FIG. 3, the height of the side wall 46b is twice or more that of the side wall 42b.

An inner surface of the upper member 42 in the vicinity of a lower end of the side wall 42b is in contact with an outer surface of the reinforcing member 46 in the vicinity of an upper end of the side wall 46b and is joined to a lower end of the side wall 42b by welding 60. As a result, the upper member 42 and the reinforcing member 46 form a closed cross section having an upper hollow portion 50.

An inner surface of the lower member 44 in the vicinity of an upper end of the side wall 44b is in contact with the outer surface of the reinforcing member 46 in the vicinity of a lower end of the side wall 46b and is joined to an upper end of the side wall 44b by welding 62. As a result, the lower member 44 and the reinforcing member 46 form a closed cross section having a lower hollow portion 52. A position of the welding 62 is set relatively lower than that of the welding 60. Therefore, as shown in FIG. 2, when the side rail 40 is seen from the side, the upper member 42, the reinforcing member 46, and the lower member 44 are arranged in this order from the upper side to the lower side.

A height HU1 of a cross section of the upper hollow portion 50 (refers to a distance between a lower surface of the upper wall 42a which is an upper end of the upper hollow portion 50 and an upper surface of the lower wall 46a which is a lower end of the upper hollow portion 50 in the vertical direction) is higher than a height HL1 of a cross section of the lower hollow portion 52 (refers to a distance between a lower surface of the lower wall 46a which is an upper end of the lower hollow portion 52 and an upper surface of the lower wall 44a which is a lower end of the lower hollow portion 52 in the vertical direction). In the example of FIG. 3, HU1 is about nine times as high as HL1. The lower wall 46a of the reinforcing member 46 is located at a position in the vicinity of the lower wall 44a of the lower member 44 and away (about 9 times in the example of FIG. 3) from the upper wall 42a of the upper member 42. This means that, in a B-B cross section of the part P2 shown in FIG. 3, the lower wall 46a of the reinforcing member 46 is disposed on the side of the compression region Q1, and the compression region Q1 is reinforced by two horizontally expanding walls of the lower wall 44a and the lower wall 46a. On the other hand, in the vicinity of the upper wall 42a of the upper member 42 located on the side opposite to the compression zone Q1, the only wall which extends horizontally is the upper wall 42a, but there is no need to reinforce it, and thus there is no problem. In the part P2, the arrangement of the reinforcing member 46 is set so that a strength required for the compression region Q1 can be secured.

In a C-C cross section which is the upper bending portion shown in FIG. 4, the basic configuration is the same as that in the B-B cross section in FIG. 3. That is, the side rail 40 has a U-shaped reinforcing member 46 which is sandwiched between the inverted U-shaped upper member 42 and the U-shaped lower member 44. The upper member 42 includes the upper wall 42a and the side walls 42b, the lower member 44 includes the lower wall 44a and the side walls 44b, and the reinforcing member 46 includes the lower wall 46a and the side walls 46b. An inner surface of the side wall 42b of the upper member 42 is joined to an outer surface of the side wall 46b of the reinforcing member 46 by the welding 60, and the upper member 42 and the reinforcing member 46 form a closed cross section having the upper hollow portion 50. Further, an inner surface of the side wall 44b of the lower member 44 is joined to an outer surface of the side wall 46b of the reinforcing member 46 by the welding 62. The lower member 44 and the reinforcing member 46 form a closed cross section having the lower hollow portion 52.

A height of the side wall 42b of the upper member 42 is the lowest, next, a height of the side wall 46b of the reinforcing member 46 is low, and a height of the side wall 44b of the lower member 44 is the highest. In the example of FIG. 4, the height of the side wall 46b is about twice that of the side wall 42b, and the height of the side wall 44b is about 2.5 times that of the side wall 46b. Additionally, a height HU2 of the cross section of the upper hollow portion 50 (refers to a distance between the lower surface of the upper wall 42a which is the upper end of the upper hollow portion 50 and the upper surface of the lower wall 46a which is the lower end of the upper hollow portion 50 in the vertical direction) is substantially the same as a height HL2 of the cross section of the lower hollow portion 52 (refers to a distance between the lower surface of the lower wall 46a which is the upper end of the lower hollow portion 52 and the upper surface of the lower wall 44a which is the lower end of the lower hollow portion 52 in the vertical direction).

The height of the side wall 42b of the upper member 42 is substantially the same as that of the side wall 42b of the upper member 42 in FIG. 3. The height of the side wall 46b of the reinforcing member 46 is about 0.6 times that of the side wall 46b of the reinforcing member 46 in FIG. 3. The height of the side wall 44b of the lower member 44 is about 2.5 times that of the side wall 44b of the lower member 44 in FIG. 3. Further, the height HU2 of the cross section of the upper hollow portion 50 provided in the upper bending portion shown in FIG. 4 is a height (a length) which is about 0.6 times the height HU1 of the cross section of the upper hollow portion 50 of the lower bending portion shown in FIG. 3. On the other hand, the height HL2 of the cross section of the lower hollow portion 52 provided in the upper bending portion shown in FIG. 4 is a height (a length) which is about five times the height HL2 of the cross section of the lower hollow portion 52 of the lower bending portion shown in FIG. 3. Additionally, the sum of the height HU2 of the cross section of the upper hollow portion 50 and the height HL2 of the cross section of the lower hollow portion 52 is about 1.1 times larger than that of the height HU1 of the cross section of the upper hollow portion 50 and the height HL1 of the cross section of the lower hollow portion 52 shown in FIG. 3, and thus a cross-sectional area is increased.

In the side rail 40 shown in FIG. 4, the lower wall 46a of the reinforcing member 46 is located at substantially the same distance from the upper wall 42a of the upper member 42 and the lower wall 44a of the lower member 44 in the C-C cross section included in the part P4. Therefore, it can be understood that the side of the upper member 42 belonging to the compression area Q2 and the side of the lower member located on the opposite side are formed to have the same strength. The part P4 may have an increased cross-sectional area of the side rail 40 as compared with the part P2, and a strength thereof is increased as a whole. Therefore, in the compression region Q2, although the distance is far from the lower wall 46a of the reinforcing member 46, a sufficient strength is secured. However, when the configuration in the vicinity of the compression region Q2 is as shown in FIG. 3, the effect of reinforcement due to the reinforcing member 46 cannot be received in the compression region Q2, and a required strength cannot be secured. In the part P4, the reinforcing member 46 is disposed at a position in which the strength required for the compression region Q2 can be secured.

As described above, in the embodiment, as shown in FIG. 2, the height and the arrangement of the three members including the upper member 42, the lower member 44, and the reinforcing member 46 are adjusted to be appropriately changed according to each of the positions in the forward and rearward direction. In particular, since the need for reinforcement is high in the compression region Q1 of the lower bending portion and the compression region Q2 of the upper bending portion, the reinforcing member 46 is set to be closer to the compression regions Q1 and Q2 than the surroundings. Accordingly, in the side rail 40, the required strength at each of the positions can be secured.

In the example shown in FIGS. 3 and 4, the reinforcing member 46 has the same U-shape as the lower member 44. However, it is also possible for the reinforcing member 46 to have the same inverted U-shape as the upper member 42. Further, the reinforcing member 46 may have a closed sectional shape (for example, a square pipe) or an H-shape. The reinforcing member 46 may have a shape having a substantially horizontal wall surface and substantially vertical side walls provided at both ends thereof.

In the mode shown in FIG. 2, the side rail 40 is configured by three members including the upper member 42, the lower member 44, and the reinforcing member 46 over the entire length. However, the upper member 42, the lower member 44, and the reinforcing member 46 do not necessarily need to be provided over the entire length of the side rail 40. This will be described with reference to FIG. 5.

Figure 5:
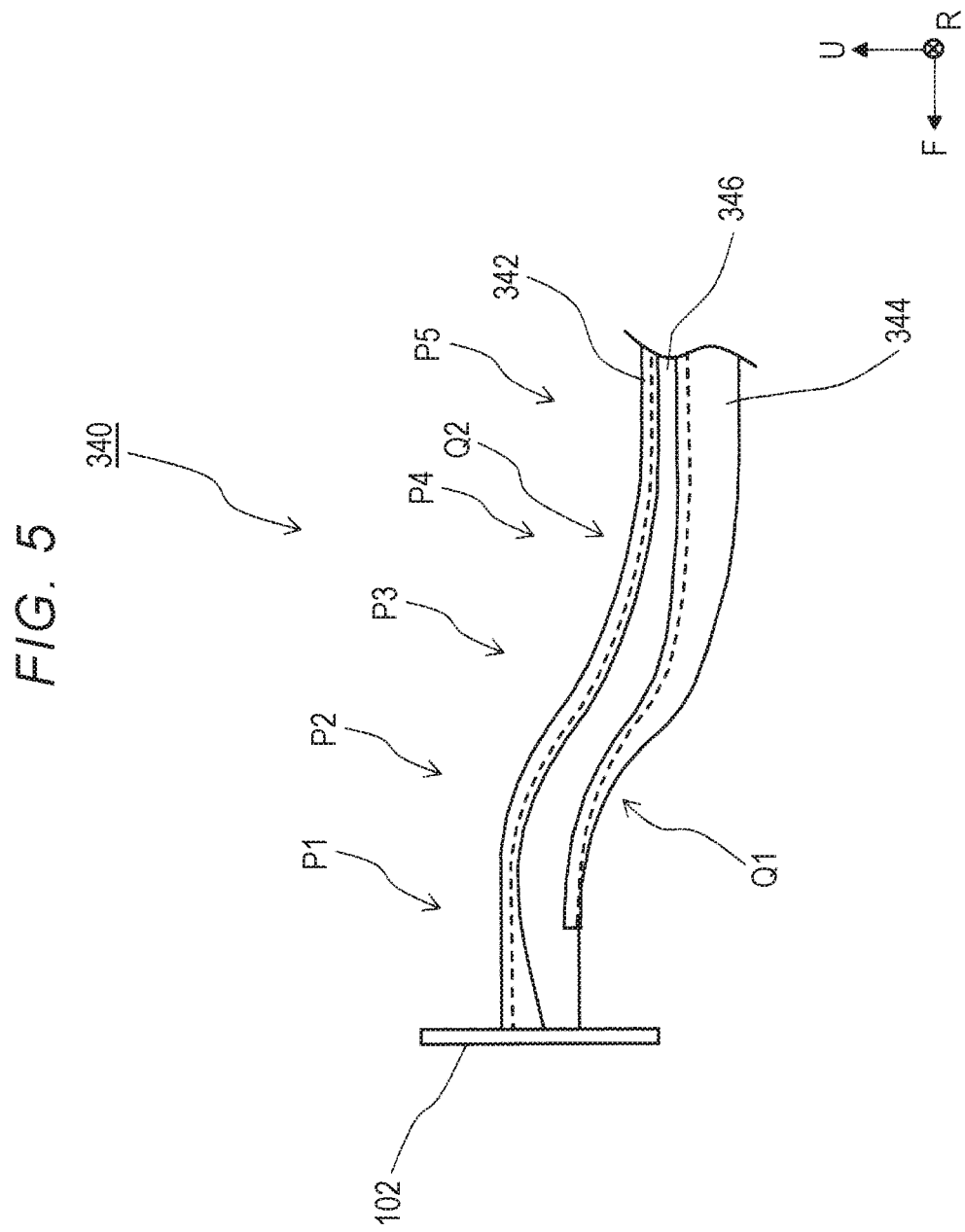
FIG. 5 is a partial side view of a side rail according to a modified example.

FIG. 5 is a view corresponding to FIG. 2 and shows a side surface of a side rail 340 according to another embodiment. A basic shape of the side rail 340 shown in FIG. 5 is the same as that of the side rail 40 shown in FIG. 2. That is, the side rail 340 includes a horizontal part P1, a lower bending portion P2, a downwardly inclined part P3, an upper bending portion P4, and a horizontal part P5 sequentially from the side of the plate member 102. A lower portion of the part P2 is a compression region Q1, and an upper portion of the part P4 is a compression region Q2.

The side rail 340 is formed using an upper member 342, a lower member 344, and a reinforcing member 346. Then, the part P2 to the part P5 are formed in the same manner as in the structure shown in FIGS. 2 to 4. On the other hands, in the part P1, the side rail 340 is formed short so that the lower member 344 does not reach a tip end. Additionally, a height of a side wall of the upper member 342 becomes higher toward the tip end. A shape of the reinforcing member 346 is substantially uniform throughout the part P1. That is, in a front portion of the part P1, although the lower member 344 is not provided, a strength thereof is supplemented by the upper member 342 instead. Since there is no compression region in the part P1, a sufficient strength can be secured by a closed sectional shape formed by the upper member 342 and the reinforcing member 346.

As described above, in the compression regions Q1 and Q2 in which the strength is most needed, the side rail 340 may be formed by using three members including the upper member 342, the lower member 344, and the reinforcing member 346 and changing a position of the reinforcing member 346 relatively. In other parts in which the strength is secured, one of the upper member 342, the lower member 344, and the reinforcing member 346 can be omitted, and also although not omitted, a shape of one or more members can be reduced to reduce the weight. Of course, it is also possible to join another member having a longitudinal shape to the side rail 340 for the purpose of, for example, connecting to another member.

The side rail 40 has a high assemblability in a manufacturing process. For example, as shown in FIG. 3, in the side rail 40, the welding 60 with the side wall 42b of the upper member 42 and the welding 62 with the side wall 44b of the lower member 44 are performed on the outer surface of the side wall 46b of the reinforcing member 46. The weldings 60 and 62 can be performed simultaneously. Therefore, the welding can be performed before the upper member 42, the lower member 44, and the reinforcing member 46 are largely deformed by heat input during the welding, or in a state in which they are thermally deformed to the same extent. As a result, the welding can be easily performed, and reliability, stability or strength of the welding can be increased, and the quality can be improved.

Figure 6:
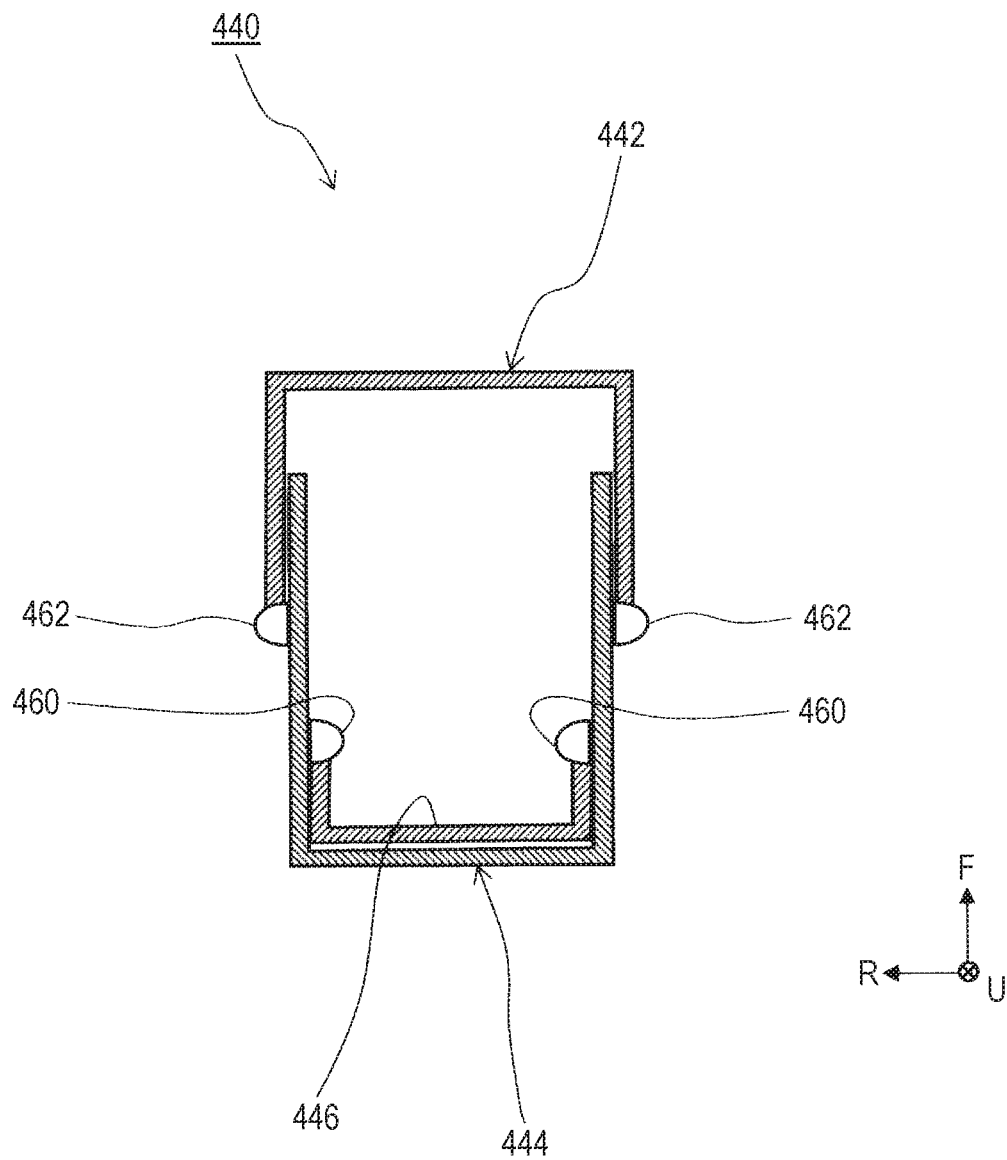
FIG. 6 is a sectional view of a side rail according to a reference embodiment.

FIG. 6 is a sectional view of a side rail 440 according to a reference embodiment. In the side rail 440, an upper member 442 and a lower member 444 form a closed cross section, and a reinforcing member 446 is provided therein. Therefore, at the time of manufacturing, first, welding 460 of the reinforcing member 446 is performed on an inner surface of a side wall of the lower member 444, and then, welding 462 of the upper member 442 is performed on an outer surface of a side wall of the lower member 444. In this process, it is difficult to perform the welding 460 and 462 at the same time. Additionally, after the first welding 460 is performed, the reinforcing member 446 and the lower member 444 are heated and thermally deformed. Then, since the welding 462 for joining the lower member 444 which is thermally deformed and the upper member 442 which is not thermally deformed is performed, welding is generally difficult.

In the above description, the front suspension member has been described as an example. However, the embodiments can be equally applied to a rear suspension member. In the rear suspension member, side rails which extend toward the rear of the vehicle are provided on both sides of a rear portion of the cross member.

What is claimed is:

1. A suspension member comprising:

a side rail which extends in a forward and rearward direction of a vehicle and has a lower bending portion which is bent downward toward a cross member, and an upper bending portion which is bent upward, wherein the side rail is formed in a closed sectional structure by combining an upper member, a lower member, and a reinforcing member located between the upper member and the lower member, the upper member and the reinforcing member are fixed by welding and form a closed cross section having an upper hollow portion, the reinforcing member and the lower member are fixed by welding and form a closed cross section having a lower hollow portion, a distance from an upper end to a lower end of the upper hollow portion in a vertical direction in the lower bending portion is longer than that in the upper bending portion, and a distance from an upper end to a lower end of the lower hollow portion in the vertical direction in the upper bending portion is longer than that in the lower bending portion.

2. The suspension member according to claim 1, wherein:

a cross section of the upper member has an inverted U-shape, a cross section of the lower member has a U-shape, a cross section of the reinforcing member has a U-shape or an inverted U-shape, the upper member is welded to an upper portion of an outer surface of a side wall of the reinforcing member, and the lower member is welded to a lower portion of the outer surface of the side wall of the reinforcing member.

* * * * *